Nov. 24, 1931.  A. BAUMANN  1,833,064
REGULATING MEANS FOR BLOWERS
Filed Feb. 10, 1928

A. Baumann
INVENTOR

By: Marks & Clark
Attys.

Patented Nov. 24, 1931

1,833,064

UNITED STATES PATENT OFFICE

ADOLF BAUMANN, OF BADEN, SWITZERLAND, ASSIGNOR TO AKTIENGESELLSCHAFT BROWN, BOVERI AND CIE., OF BADEN, SWITZERLAND

REGULATING MEANS FOR BLOWERS

Application filed February 10, 1928, Serial No. 253,465, and in Germany February 25, 1927.

Methods of regulating the throttling for supercharging blowers for internal combustion engines to a constant pressure above that of the atmosphere are known. In such methods the member indirectly or directly effecting the throttling is subject on the one hand to the final pressure which is to be kept constant and on the other hand to the atmospheric pressure plus the pressure of a spring or weight, so that regulation can be effected to a constant difference in pressure with respect to the atmospheric pressure, that is to a constant pressure. When, for instance in the case of mountain railways or aircraft, the atmospheric pressure and consequently the suction pressure of the blower changes, such a method of regulation, which is for instance set to 0.50 kg. per cm.² pressure difference, would regulate at an atmospheric pressure of 0.50 kg. per cm.² to a final pressure of 1.0 kg./cm.² absolute, and at 1.0 kg./cm.², that is atmospheric pressure, to a final pressure of 1.50 kg./cm.² absolute. Frequently as for instance in the case of the supercharging blowers of oil or petrol engines, for keeping the engine output constant an invariable absolute final pressure is found desirable, that is for instance 1.0 kg./cm.² absolute.

The present invention relates to the operating member of a suction throttling device which fulfils this condition, even when it is required that the blower shall deliver a constant quantity of air, as is the case for instance with the charging blowers for aircraft and generally in every case where the blower delivers to a constant opening.

In the accompanying drawings a constructional example of the invention is shown.

Figure 1:
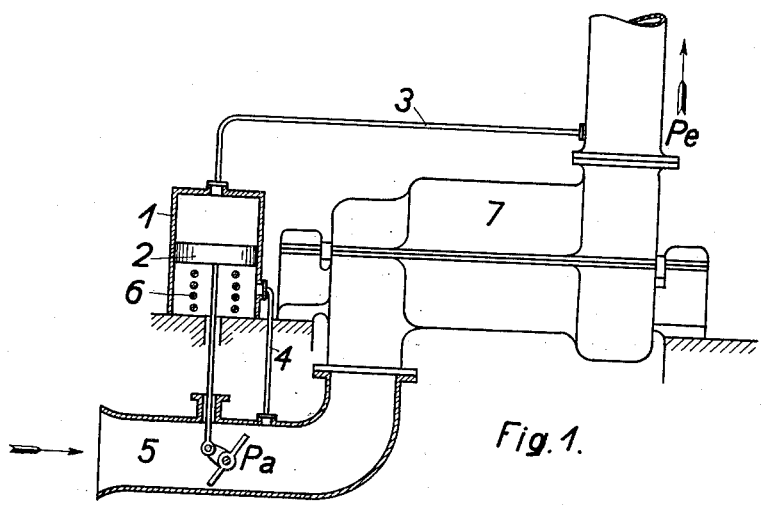
Fig. 1 is an elevational view of the apparatus partly in section.

According to Fig. 1 of the drawings, this constructional form consists of the piston 2 or the like which is enclosed in a cylinder 1 and one side of which is acted on through the pipe 3 by the absolute final pressure $Pe$ of the blower 7 which is to be kept constant, while the other side of the piston receives through the pipe 4 the pressure after the throttling member 5 and is also loaded by a spring 6 or weight acting in the same direction. The throttling member 5 can be operated directly, as shown, or indirectly, for instance by way of a servo-motor. When the blower having a constant speed of revolution is constructed for a definite pressure ratio $p$ of for instance 2.0, the condition for obtaining equilibrium will be as follows: if $Pa$ be the suction pressure of the blower after the throttling member, $Pe$ the final pressure of the blower F the piston surface, disregarding cross-sectional area of the piston rod, and K an approximately constant force produced by the action of a spring or a weight:

Blower characteristic $Pe = Pa \cdot p$ (1)
Regulating equilibrium $Pe \cdot F = Pa \cdot F + K$ (2)
Substituting (1) in (2) $Pa \cdot p \cdot F = Pa \cdot F + K$
$Pa(p \cdot F - F) = K$ $$Pa = \frac{K}{F(p-1)} \quad (3)$$

Since the force K and the pressure ratio $p$ of the blower are invariable, the apparatus will regulate according to Equation (3) to constant absolute suction pressure after throttling and according to Equation 1., to a constant absolute final pressure $Pe$. Greater or smaller variations from this final pressure ("non-uniformity"), due to the spring K, are bound to occur as in any other method of regulation.

Figure 2:
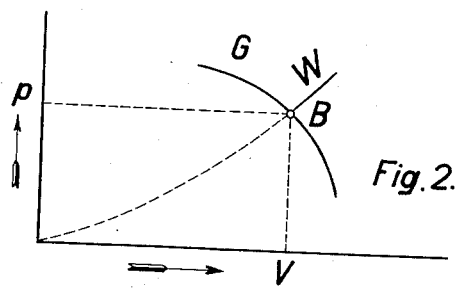
Fig. 2 is a diagram of the relation of pressure and volume conditions relative to the consumption resistance.

The constant pressure ratio $p$ is subject to the further condition, that the air consumption shall remain invariable, that is, the consumption resistance W (Fig. 2) must remain constant during the regulating process, so that it will always intersect the blower characteristic G in the same point B, which is for intance the case when the blower has to charge an oil or petrol engine having an invariable speed of revolution. When the resistance curve is changed, for instance by the internal combustion engine consuming a greater quantity of air, the pressure ratio $p$ of the blower will be caused to change in a positive manner. The same final pressure $Pe$ can then however be set again according to Equation 1. by altering the force K of the spring and be kept constant.

If in the known manner the pipe 4 were in communication with the atmosphere (pressure Po), the following conditions of equilibrium would result:

Blower characteristic $\quad Pe = Pa \cdot p \quad (1')$
Regulating equilibrium $\quad Pe \cdot F = Po \cdot F + K \quad (2')$
Introducing (1') into (2') $\quad Pa \cdot p \cdot F = Po \cdot F + K$ $$Pa = \frac{Po \cdot F + K}{p \cdot F}$$

$$Pa = \frac{Po + K/F}{p} \quad (3')$$

that is to say, the absolute suction pressure $Pa$ after throttling varies with the barometer reading $Po$; it would not, therefore as in the present invention, be kept constant, so that the absolute final pressure $Pe$ would be variable owing to the constant pressure condition $p$.

What I claim is:

1. A regulator for blowers compirsing a cylinder, a piston in said cylinder, an outlet passage for the blower, an inlet passage for the blower, a throttle in said inlet passage operable upon movement of said piston, a conduit connecting said outlet passage with one end of said cylinder, a second conduit connecting the other end of said cylinder with said inlet passage intermediate the throttle and the blower, and means in said other end of the chamber acting on said piston for opposing the pressure on the opposite side of the piston.

2. Apparatus for regulating the absolute delivery pressure of blowers operating with variable inlet pressures which comprises a throttling valve in the suction pipe, a cylinder, a piston in the cylinder subject to regulated pressure on both sides for actuating said valve, and means exerting a substantially constant force on the piston in opposition to that of the delivery pressure.

3. A device for regulating a charging blower for an internal combustion engine having a throttling device in the suction pipe for the purpose of keeping the final pressure uniform, a member controlling the throttling device loaded differentially by means exerting the final pressure of the blower and by an approximately constant mechanical force, characterized by the feature that for keeping the final pressure constant with a variable atmospheric pressure the suction pressure ($Pa$) prevailing behind the throttle is added to the said constant force.

In testimony whereof I have signed my name to this specification.

ADOLF BAUMANN.